United States Patent
Hwang et al.

(10) Patent No.: US 11,907,281 B2
(45) Date of Patent: Feb. 20, 2024

(54) METHODS AND SYSTEMS FOR DISPLAYING RELEVANT DATA BASED ON ANALYZING ELECTRONIC IMAGES OF FACES

(71) Applicant: MicroStrategy Incorporated, Tysons Corner, VA (US)

(72) Inventors: Andrew Hwang, Arlington, VA (US); Joseph Bergman, Arlington, VA (US); Alexander Tsai, Chantilly, VA (US)

(73) Assignee: MICROSTRATEGY INCORPORATED, Tysons Corner, VA (US)

( * ) Notice: Subject to any disclaimer, the term of this patent is extended or adjusted under 35 U.S.C. 154(b) by 275 days.

(21) Appl. No.: 17/166,023

(22) Filed: Feb. 3, 2021

(65) Prior Publication Data

US 2021/0240759 A1    Aug. 5, 2021

Related U.S. Application Data

(60) Provisional application No. 62/969,437, filed on Feb. 3, 2020.

(51) Int. Cl.
*G06F 3/0482* (2013.01)
*G06F 16/532* (2019.01)
(Continued)

(52) U.S. Cl.
CPC ............ *G06F 16/532* (2019.01); *G06F 18/22* (2023.01); *G06F 18/40* (2023.01); *G06T 3/40* (2013.01);
(Continued)

(58) Field of Classification Search
CPC ........ G06F 16/532; G06F 18/22; G06F 18/40; G06F 3/0482; G06V 40/172; G06V 40/161; G06V 10/993; G06V 10/945; G06T 3/40
See application file for complete search history.

(56) References Cited

U.S. PATENT DOCUMENTS 9,070,182 B1 * 6/2015 Chua ..................... G06V 40/162
10,885,099 B1 * 1/2021 Price ..................... G06F 16/538
(Continued)

OTHER PUBLICATIONS

Shreyas Gulur Shivashankar et al., Emotion Sensing Using Facial Recognition, Aug. 1, 2017, International Conference on Smart Technologies for Smart Nation, pp. 830-833 (Year: 2017).*
(Continued)

*Primary Examiner* — Tam T Tran
(74) *Attorney, Agent, or Firm* — Bookoff McAndrews, PLLC

(57) ABSTRACT

Disclosed are methods, systems, and non-transitory computer-readable media for displaying relevant data based on facial recognition. The method may include displaying a graphic user interface (GUI) on a display of a user device for a face recognition search process, and determining whether a facial recognition user input has been received. In response to determining the facial recognition user input has been received, a request message may be generated, the request message include an image, and the request message may be transmitted to a facial recognition service. A response may be received from the facial recognition service, and the GUI may be updated to display one or more information cards based on the received response, the one or more information cards being associated with the image.

20 Claims, 7 Drawing Sheets

(51) Int. Cl.
    *G06T 3/40*         (2006.01)
    *G06V 10/98*       (2022.01)
    *G06V 40/16*       (2022.01)
    *G06F 18/22*       (2023.01)
    *G06F 18/40*       (2023.01)
    *G06V 10/94*       (2022.01)

(52) U.S. Cl.
    CPC .......... *G06V 10/945* (2022.01); *G06V 10/993* (2022.01); *G06V 40/161* (2022.01); *G06V 40/172* (2022.01); *G06F 3/0482* (2013.01)

(56) References Cited

U.S. PATENT DOCUMENTS

| | | | |
|---|---|---|---|
| 2015/0085146 A1* | 3/2015 | Khemkar | G06V 20/30 348/207.1 |
| 2017/0104957 A1* | 4/2017 | Farrell | G06F 3/04842 |
| 2017/0212910 A1* | 7/2017 | Morris | G06T 7/70 |
| 2020/0186836 A1* | 6/2020 | Milanfar | H04N 19/48 |

OTHER PUBLICATIONS

Shazia Afzal et al., Perception of Emotional Expressions in Different Representations Using Facial Feature Points, Sep. 1, 2009, International Conference on Affective Computing and Intelligent Interaction and Workshops, pp. 1-6 (Year: 2009).*

* cited by examiner

METHODS AND SYSTEMS FOR DISPLAYING RELEVANT DATA BASED ON ANALYZING ELECTRONIC IMAGES OF FACES

RELATED APPLICATION(S)

This application claims priority to U.S. Provisional Application No. 62/969,437 filed Feb. 3, 2020, the entire disclosure of which is hereby incorporated herein by reference in its entirety.

TECHNICAL FIELD

Various embodiments of the present disclosure relate generally to methods and systems for displaying relevant data and, more particularly, to methods and systems for displaying relevant data based on facial recognition.

BACKGROUND

Databases often include information about many topics. Users often retrieve content from issuing a query, for example, using natural language or using a structured query language (SQL). However, accessing the information may be difficult and/or time-intensive using separate querying programs or interfaces. Therefore, there may be a challenge in quickly and accurately retrieving relevant information, such as when a user only has an image of a face.

The present disclosure is directed to overcoming one or more of these above-referenced challenges.

SUMMARY OF THE DISCLOSURE

According to certain aspects of the disclosure, systems and methods are disclosed for displaying relevant data based on facial recognition. For instance, a method may include: displaying a graphic user interface (GUI) on a display of a user device for a face recognition search process; determining whether a facial recognition user input has been received; in response to determining the facial recognition user input has been received, generating a request message, the request message include an image; transmitting the request message to a facial recognition service; receiving a response from the facial recognition service; and updating the GUI to display one or more information cards based on the received response, the one or more information cards being associated with the image.

Moreover, a client device or system may display relevant data based on facial recognition, the client device or system including: at least one memory storing instructions; and at least one processor executing the instructions to perform operations. The operations may include: displaying a graphic user interface (GUI) on a display of a user device for a face recognition search process; determining whether a facial recognition user input has been received; in response to determining the facial recognition user input has been received, generating a request message, the request message include an image; transmitting the request message to a facial recognition service; receiving a response from the facial recognition service; and updating the GUI to display one or more information cards based on the received response, the one or more information cards being associated with the image.

Additionally, a non-transitory computer-readable medium may store instructions that, when executed by a processor, cause the processor to perform operations. The operations may include: displaying a graphic user interface (GUI) on a display of a user device for a face recognition search process; determining whether a facial recognition user input has been received; in response to determining the facial recognition user input has been received, generating a request message, the request message include an image; transmitting the request message to a facial recognition service; receiving a response from the facial recognition service; and updating the GUI to display one or more information cards based on the received response, the one or more information cards being associated with the image.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
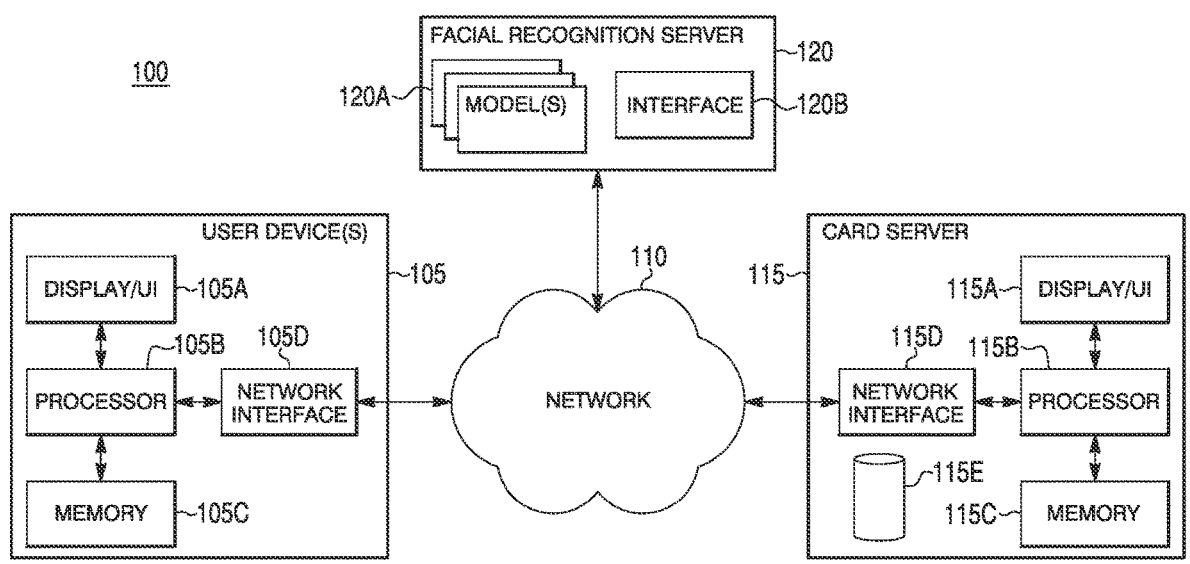
FIG. 1 depicts an exemplary system for displaying relevant data based on facial recognition, according to one or more embodiments.

Various embodiments of the present disclosure relate generally to methods and systems for displaying relevant data.

The subject matter of the present description will now be described more fully hereinafter with reference to the accompanying drawings, which form a part thereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter can be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In general, the present disclosure is directed to systems, methods, and computer-readable medium for displaying relevant data based on facial recognition. For instance, a system of the present disclosure may display a GUI to receive a facial recognition user input (e.g., a selection of an image and/or an AR function); based on the facial recognition user input, receive matching faces for detected faces of an image of the facial recognition user input; retrieve information cards corresponding to the matching faces; and update the GUI to display the information cards to the user. Therefore, a user may quickly and accurately retrieve relevant information when a user only has an image of a face/access to a camera function to obtain an image of a face. For instance, as users often retrieve content from databases (such as information about people) by issuing a query (such as natural language or SQL), there may be a need for easier/more intuitive access to the content of databases. Moreover, a user may not have enough relevant information (e.g., name, position, etc.) to describe a person sufficiently to form a query to retrieve the content. However, facial recognition may enable quick content retrieval by only selecting an image; enable intuitive access by only requiring an image; and/or overcome an omission of sufficient data to form a query to retrieve the content instead of contextually relevant keywords/phrases.

FIG. 1 depicts an exemplary system 100 for displaying relevant data based on facial recognition, according to one or more embodiments. The system 100 may include one or more user device(s) 105, a network 110, a card server 115, and/or a facial recognition server 120. Hereafter, while the card server 115 and the facial recognition server 120 may interact with one or a plurality of the one or more user devices 105, this description will refer to the one or more user devices 105 as "the user device 105," so as to simplify the description of the concepts described herein. One of skill in the art would recognize that the card server 115 may configure the one or more user devices 105 as to experience different functionalities, have access to different information (e.g., by different card templates), and/or enable the one or more user devices 105 to search different sets of faces (e.g., determined by credentials such as user ID or set ID, discussed below). Additionally, while the functionality carried out by the card server 115, the facial recognition server 120, and/or the user device 105 are discussed herein separately, in practice these features may be executed on more or fewer devices.

The user device 105, the card server 115, and the facial recognition server 120 may be connected via the network 110, using one or more standard communication protocols. The network 110 may be one or a combination of a wide area network (e.g., the internet), a local network, or other network. The user device 105, the card server 115, and the facial recognition server 120 may transmit and receive messages from each other across the network 110.

The user device 105 may include a display/user interface (UI) 105A, a processor 105B, a memory 105C, and/or a network interface 105D. The user device 105 may be a computer, a cell phone, a tablet, a wearable device, etc. The user device 105 may execute, by the processor 105B, an operating system (O/S) and at least one application (e.g., each stored in memory 105C). The application may be a browser program or a mobile application program (which may also be a browser program in a mobile O/S). The application may generate one or more graphic user interfaces (GUIs) based on instructions/information stored in the memory 105C, instructions/information received from the card server 115, and/or instructions/information received from the facial recognition server 120. For instance, the GUIs might be application GUIs for the application executed based on XML and Android programming languages or Objective-C/Swift, but one skilled in the art would recognize that this may be accomplished by other methods, such as webpages executed based on HTML, CSS, and/or scripts, such as JavaScript. The display/UI 105A may be a touch screen or a display with other input systems (e.g., mouse, keyboard, trackpad, etc.). The network interface 105D may be a TCP/IP network interface for, e.g., Ethernet or wireless communications with the network 110. The processor 105B, while executing the application, may receive user inputs from the display/UI 105A, and perform actions or functions in accordance with the application.

The application, executed by the processor 105B of the user device 105, may display a graphical user interface (GUI) on the display/UI 105A for a face recognition search process; receive user inputs associated with the GUI; and/or process the user inputs to update the GUIs to execute the face recognition search process, as discussed in more detail below. For instance, the application may receive user inputs through a camera application (or a user input selecting an already existing image on the user device 105) to obtain an image, and process the image to execute the face recognition search process. The face recognition search process is described in detail below.

The card server(s) 115 may include a display/UI 115A, a processor 115B, a memory 115C, and/or a network interface 115D. The card server 115 may be a computer, system of computers (e.g., rack server(s)), and/or or a cloud service computer system. The card server 115 may execute, by the processor 1158, an operating system (O/S) and at least one instance of an information card program (e.g., each stored in memory 115C). The card server 115 may store or have access to card information 115E (e.g., hosted on a third party server). The display/UI 115A may be a touch screen or a display with other input systems (e.g., mouse, keyboard, etc.) for an operator of the card server 115 to control the functions of the card server 115 (e.g., update the information card program and/or the card information 115E). The network interface 115D may be a TCP/IP network interface for, e.g., Ethernet or wireless communications with the network 110.

The information card program, executed by the processor 1156 on the card server 115, may coordinate with the facial recognition server 120 to train one or more model(s) 120A; coordinate with the user device 105 to set up the application of the user device 105 for the face recognition search process; and coordinate with the user device 105 to provide information cards to be displayed via the GUI of the user device 105. Each of these functions of the information card program will be discussed in detail below.

The facial recognition server 120 may host a facial recognition service. The facial recognition service may include the one or more model(s) 120A and an interface 120B, and the facial recognition service may execute a facial recognition program. One skilled in the art would recognize that the facial recognition server 120 may be a part of the card server 115 or (as depicted) separate from the card server 115. For instance, the facial recognition server 120 may be hosted by a third party or in association with the card server 115.

The interface 120B may receive requests from the card server 115 and/or requests from the user device 105; input the requests to the facial recognition program; receive outputs from the facial recognition program; and/or transmit responses based on the outputs to user device 105 and/or the card server 115. The one or more model(s) 120A may be machine learning models, such as neural networks.

The facial recognition program may receive the input requests from the interface 120B; (1) train the one or more model(s) 120A, as discussed in detail below, and/or (2) detect and match one or more faces of images using a model of the one or more model(s) 120A, as discussed in detail below; and generate outputs to be transmitted to the interface 120B, so that interface 120B may transmit responses to the user device 105 and/or the card server 115 based on the outputs.

To train the one or more model(s) 120A, the facial recognition program may receive a request to generate a new model (or update an extant model); extract one or more images from the request; in the case of a new model, initialize a machine learning model or, in the case of an update to an extant model, obtain the corresponding machine learning mode; and/or train the machine learning model using the one or more images of the request.

To detect and match one or more faces of an image using a model of the one or more model(s) 120A, the facial recognition program may receive an input request; extract an image from the request; process the image into a feature vector; select a model of the one more model(s) 120A (e.g., based on a ID in the request); and/or process the feature vector through the selected model to obtain an output. The output may be a face identification (ID) data structure. The face ID data structure may include detected face(s) information and/or matching face(s) information. The detected face(s) information may indicate zero, one, or more detected face(s) in the image and/or location and size information (e.g., pixel coordinates and/or bounding box coordinates in the input image) for each of the detected faces in the image. The matching face(s) information may include, for each detected face, zero, one, or more matching faces and, for each of the matching faces, a face ID and/or a confidence score. The matching face(s) information may only include matching faces that have a confidence score above a threshold confidence score (e.g., 85%) for a detected face. A face ID may be an alphanumeric string. Additionally or alternatively, the matching face(s) information may also include an entity ID associated with the face ID if the facial recognition program has entity IDs associated with face IDs. The entity ID may be an alphanumeric string.

In one aspect of the disclosure, the application, while executing on the user device 105, may enable the user device 105 to dynamically generate and display contextually relevant information cards in response to certain actions being performed on the user device 105. Specifically, as discussed below, the certain actions may include inputting an image; inputting an image that includes one or more faces; inputting an image that includes one or more faces that match a known face of a plurality of known faces; and/or inputting an image that includes one or more faces that match a known face of a plurality of known faces above a confidence threshold. Moreover, the application may enable the user device 105 to obtain and provide information from the card information 115E through information cards that may be dynamically adjusted based on the actions on the user device 105. The application may interact with an operating system of the user device 105, for example, using one or more application programming interfaces (APIs), to obtain various types of content, such as image data from a camera application or from a picture library (e.g., a camera roll) of the user device 105.

The user device 105 may be associated with a user. When the application is installed, a user identifier for the user may be determined. For example, on installation or afterward, the user may log in using one or more credentials. The application may then customize various aspects of the application for the user, including trigger conditions used to detect an appropriate context for providing an information card (such as which sets of faces the user may search for using the user device 105) as well as the type of content included in the information cards.

As an example, the user may be a member of an organization, e.g., an employee of a company. The card information 115E may represent database records stored by or for the organization. The records may not be publicly available and may be subject to data access restrictions, such as requirements that users be issued credentials from the organization that grant authorization to access the records. Different users may be granted different levels of authorization, and the card server 115 may enforce access restrictions so that each user is only allowed to access the subsets of information the user is authorized to access.

The system 100 may improve techniques used to provide users with access to information in a more convenient and contextually relevant fashion. Information is presented through information cards that may be displayed in response to a user inputting/selecting an image of a face, to find an information card associated with a person corresponding to the face. In this manner, the system 100 may improve access to relevant information for a user based on an image, which does not necessarily require any formatting or processing on the user's part. Unlike many other systems, the user might not need to manually format a query or gather additional relevant information to formulate a query to obtain relent information.

In FIG. 1, information cards may be presented on the user device 105 as cards that include information obtained from the card information 115E. The cards may include dynamically generated information so that they reflect changes to data stored in the card information 115E. For example, the card server 115 may store card templates that identify, for example, the format and structure of the cards. The specific information that is displayed in the cards may be dynamically populated into the templates at the time the cards are determined to be relevant, so that each display of a card may include information generated from up-to-date information from the card information 115E. Thus, if the same card for the same entity (e.g., a person corresponding to a face in an image) is displayed at different times, the content may be different for each instance of the card as the information in the card information 115E changes.

The card templates may include different templates for different types of entities. For example, one template may be used for a person, another template may be used for a company, another template may be used for a location (e.g., a particular store or region), and so on. Different card templates may also be defined and used for entities having different semantic relationships with the user, the user's organization, or others. For example, a first template may be used for a user that has access to human resources information, and may specify a first set of statistical measures to display in a card. A second template for a user that does not have access to human resources information may specify a different set of statistical measures to display in a card.

In one aspect of the disclosure, the user device 105, the card server 115, and the facial recognition server 120 (collectively, "a system") may operate together to set up the system to execute the face recognition search process on the user device 105 so that relevant data might be displayed based on facial recognition. Specifically, the process to set up the system to execute the face recognition search process may include: a first process to train the one or more model(s) 120A and distribute relevant information to relevant user device(s) 105; a second process to update the one or more model(s) 120A and distribute relevant information to relevant user device(s) 105.

The first process may start by the card server 115 obtaining images of a set of faces. For instance, the card server 115 may obtain a plurality of information cards for a plurality of persons (e.g., people); extract images from the plurality of information cards; and/or process the extracted images.

To obtain the plurality of information cards for the plurality of persons, the card server 115 may access the card information 115E and retrieve all of the information cards associated with the plurality of persons. The card server 115 may obtain the plurality of information cards for the plurality of persons based on, e.g., an entity associated with the plurality of persons having the corresponding information, organization of the information cards, or any other criteria included in the card information 115E.

To extract the images from the plurality of information cards, the card server 115 may parse the plurality of information cards; determine whether each of the plurality of information cards includes one or more images; and, for each of the plurality of information cards, in response to determining an information card includes one or more images, extract the one or more images for each of the plurality of information cards that includes one or more images. For instance, information cards associated with a person may include a head shot image or include a photo of a person.

To process the extracted images, the card server 115 may determine whether each of the extracted one or more images includes a face (e.g., using a face detection algorithm, such as a machine learning model); and, for each of the extracted one or more images, in response determining an image includes a face, associate the extracted image with an entity ID (e.g., a name). The card server 115 may obtain the entity ID by extracting an ID or name from the corresponding information card or from any metadata or other information associated with the corresponding information card. The card server 115 may also process the associated image to determine whether the associated image has a sufficient image quality (e.g., not too blurry and/or out of focus based on pixel resolution and/or spatial resolution of an image, face in image is not too small relative to overall image, etc.), acceptable aspect ratio, and/or an acceptable data size, which may all be determined by comparing the associated image with predetermined values. If the associated image does not have a sufficient image quality, the card server 115 may exclude the associated image from the process. If the associated image does not have an acceptable aspect ratio (e.g., within a range of aspect ratios), the card server 115 may process the image into an acceptable aspect ratio by, e.g., cropping the image (without cropping faces, based on facial detection algorithms) to an acceptable aspect ratio. If the associated image does not have an acceptable data size (e.g., above a threshold data size), the card server 115 may process the image through a lossless or lossy compression algorithm (e.g., JPEG compression) to reduce the data size of the associated image. Therefore, the associated image that is sent to the facial recognition image server 120 may be different than the image that is associated with the information card, thus face IDs may be of a higher quality and bandwidth may be reduced.

The first process may continue by generating a training message. To generate the training message, the card server 115 may (individually for each of the extracted images or in bulk) generate a request that includes a set ID (e.g., corresponding to an organization or the other criteria) and the extracted image(s) associated with the corresponding entity ID(s). The first process may then continue by the card server 115 transmitting the training message to the facial recognition server 120.

In response to receiving the training message, the facial recognition server 120 may train a facial recognition model. For instance, the facial recognition server 120 may train a new machine learning model, as discussed above, and associate the trained machine learning model with the set ID. Alternatively, the facial recognition model may omit training the facial recognition model, and instead use a general facial recognition model and associate the general facial recognition model with the set ID. The facial recognition server 120 may then process the images of the request through the trained facial recognition model (or the general facial recognition model) to obtain a face ID data structure for each of the images, as discussed above. The facial recognition server 120 may then generate an ID message based on the obtained face ID data structures. The ID message may include the obtained face ID data structures in association with entity IDs so that the card server 115 may store the face IDs with the entity IDs. The facial recognition server 120 may store the entity IDs in association with the face IDs as well.

The first process may then continue by the facial recognition server 120 transmitting the ID message to the card server 115. In response to receiving the ID message, the card server 115 may store the face IDs in association with the entity IDs; and generate a face ID message. The face ID message may include: entity IDs associated with face IDs. Additionally, the face ID message may also include information cards associated with the entity IDs.

The first process may then continue by the card server 115 transmitting the face ID message to one or more user devices, such as the user device 105. For instance, the card server 115 may determine the one or more user devices based on the user device 105 being associated with a user that is a member of an organization.

The user device 105 may receive the face ID message. In response to receiving the face ID message, the user device 105 may store face IDs corresponding to names. For instance, the user device 105 may store the entity IDs associated with face IDs and/or the information cards, so that the user device 105 may cache the relevant information for quick access in runtime. The first process may end, and the user device 105 may be prepared to execute the face recognition search process.

The second process may start by the card server 115 determining whether new images are included in the set of faces (or changes, such as removal and/or updates to already included images). For instance, the card server 115 may periodically obtain images of the set of faces; and determine whether changes have occurred (new information cards, deletions of information cards, updates to images of the information cards). For instance, the card server 115 may obtain a plurality of information cards for a plurality of persons (e.g., people), and determine whether the plurality of persons includes any new, updated, or deleted persons. The card server 115 may check the plurality of persons by comparing the previous plurality of persons to the current plurality of persons (e.g., by a text match program for any differences). The card server 115 may also determine whether the plurality of information cards includes any new, updated, or deleted persons and/or images by extracting images from the plurality of information cards, as discussed above; processing the extracted images, as discussed above; and determining whether entity IDs and/or images include new, updated, or deleted persons and/or images.

If there are no new images/persons, the card server 115 may continue to return and determine whether new images/persons are included in the set of faces. For instance, the card server 115 may wait for a predetermined time before checking again or for changes to the images of the set of faces to trigger an update to the facial recognition model.

In response to new images/persons, the card server 115 may re-execute training and transmit an updated face ID message to user devices, such as the user device 105. For instance, the card server 115 may indicate in the updated face ID message to include new entity IDs associated with new face IDs, existing entity IDs with new face IDs, and/or instructions to delete existing entity IDs and associated face IDs. Additionally, the updated face ID message may also include information cards associated with the new entity IDs.

The second process may then continue by the user device 105 receiving the updated face ID message. The user device 105 may then store updated face IDs corresponding to new names. For instance, the user device 105 may store new entity IDs associated with new face IDs, update existing entity IDs with new face IDs, and/or delete existing entity IDs and associated face IDs, and/or the information cards, so that the user device 105 may cache the relevant information for quick access in run-time. The second process may end, and the user device 105 may be prepared to execute the face recognition search process with updated information.

In one aspect of the disclosure, the user device 105, the card server 115, and the facial recognition server 120 may operate together to display, on the user device 105, relevant data based on facial recognition. Specifically, the user device 105, while executing application, may execute a client side of the face recognition search process. Meanwhile the card server 115 and the facial recognition server 120 may execute a server side of the face recognition search process. The face recognition search process may start by the user device 105 displaying a GUI for the face recognition search process. For instance, the user device 105 may display an application interface, such as application interface 402 depicted in GUI 400A in FIG. 4A below.

The face recognition search process may continue by the user device 105 determining whether a facial recognition user input has been received. For instance, the facial recognition user input may be a user input selecting an image for a search.

For instance, the user device 105 may display a search element (such as search element 402A). The search element may be selectable by a user input (e.g., a touch input, voice selection, etc.) to start an image selection process. The image selection process may include: in response to the search element being selected by a user input, opening a camera application of the user device 105 and/or accessing a picture library (e.g., a camera roll) of the user device 105. The image selection process may include, in the case of the opening of the camera application, a user taking a photo using the camera application; and returning the photo as the selected image for the search. The image selection process may include in the case of the accessing the picture library, the user scrolling and/or selecting a photo from the picture library and the photo may be returned as the selected image for the search. The user device 105 may update the GUI to display the camera application and/or the picture library within the application interface, or the user device 105 may launch the camera application and/or the picture library as a separate GUI.

In response to a user selecting an image, the user device may update the GUI to depict the selected image as a search image (such as search image 404A) with a launch element (such as launch element 404B). The launch element may indicate how a user may proceed (e.g., instructions for initiating the search process), and the launch element (and/or the search image) may be selectable by a user input (e.g., a touch input, voice selection, etc.) to initiate the face recognition search process using the search image. In response to the user input to initiate the face recognition search process using the search image, the facial recognition user input may be determined and the user device 105 may generate a request message.

To generate the request message, the user device 105 may process the search image; and format the processed image with a user ID and/or a set ID. To process the search image, the user device may determine whether the search image has a sufficient image quality (e.g., not too blurry and/or not out of focus, face in image is large enough relative to overall image, etc.), acceptable aspect ratio, and/or an acceptable data size. If the search image does not have a sufficient image quality, the user device 105 may reject the search image from the process and may display an error on the GUI. If the search image does not have an acceptable aspect ratio (e.g., within a predetermined range of aspect ratios), the user device 105 may process the search image into an acceptable aspect ratio by, e.g., cropping the search image (without cropping faces, based on facial detection algorithms) to an acceptable aspect ratio; if the search image cannot be processed into the acceptable aspect ratio, then the user device 105 may reject the search image from the process and display an error on the GUI. If the search image does not have an acceptable data size (e.g., above a threshold data size), the user device 105 may process the search image through a lossless or lossy compression algorithm (e.g., JPEG compression) to reduce the data size of the search image to, e.g., below the threshold data size. If the search image cannot be processed to the acceptable data size, then the user device 105 may reject the search image from the process and display an error on the GUI. Therefore, the search image that is sent to the facial recognition image server 120 may be different than the image that is selected by the user, thus face IDs may be of a higher quality (e.g., better matching confidence scores) and bandwidth may be reduced.

In response to not receiving the facial recognition user input, the user device 105 may return to waiting for the facial recognition user input, or may exit the GUI for the face recognition search process. In response to receiving the facial recognition user input, the user device 105 may then transmit the request message to the facial recognition server 120.

Generally, the facial recognition server 120 may determine whether facial recognition server 120 has received a request message from a user device, such as the user device 105. In response to not receiving the request message, the facial recognition server 120 may wait to receive the request message from a user device, such as the user device 105.

In response to receiving the request message, the facial recognition server 120 may process an image of the request message through a facial recognition model. For instance, the facial recognition server 120 may obtain the request message; extract the search image and the user ID and/or the set ID, select a model of the one or more models 120A, and process the extract search image through the selected model to obtain the face ID data structure, as discussed above. To select the model, the facial recognition server 120 may determine an appropriate model based on the user ID (e.g., match user ID to a user ID associated with a model based on credentials) and/or the set ID (match the set ID stored with models, and retrieve a corresponding model) so that an appropriate set of matching faces are searched for matches.

The facial recognition server 120 may then determine whether there are one or more matches. For instance, the facial recognition server 120 may determine a number of matches for all of the detected faces from the face ID data structure (e.g., by summing a number of matches for each detected face); and determine whether the number of matches is more than one.

In response to determining there are one or more matches, the facial recognition server 120 may transmit a matching IDs message to the user device 105. The matching IDs message may include the face ID data structure. In response to determining there are no matches, the facial recognition server 120 may transmit a no-match message to the user device 105. The no-match message may indicate no detected faces or may include the detected face(s) information and indicate no matching faces.

In response to receiving the no-match message, the user device 105 may display the search image with detected face indicators for the detected face(s) (e.g., a bounding box around each detected face), based on the detected face(s) information (translated based on a cropping or compression done to the image in the request message). In this manner, a user may be informed that the facial recognition server 120 detected a face, but that it did not match with a high enough confidence score to a known face.

In response to receiving the matching IDs message, the user device 105 may update the GUI to display a search result page. To update the GUI, the user device 105 may (1) display the search image with the detected face indicators for the detected faces (as discussed above in the no-match message case), and/or (2) display one or more information cards corresponding to matching faces.

To display one or more information cards corresponding to matching faces, the user device 105 may extract the matching face(s) information; for each detected face, extract face ID, confidence score, and/or entity ID (if included) for zero, one, or more matching faces. The user device 105 may, if no entity ID is included for a face ID: search stored face IDs for a match to the face ID; in response to determining a matching face ID, retrieve an associated entity ID to the matching face ID; retrieve associated information card(s) based on the retrieved entity ID; and display the retrieved information card(s). To match face IDs, the user device 105 may perform index matching and/or regular expression matchings on a set of known face IDs (e.g., those stored on user device 105). The user device 105 may, if an entity ID is included for a face ID: retrieve associated information card(s) based on the retrieved entity ID; and display the retrieved information card(s). Therefore, all matching faces of a search image may have information cards displayed for a user to easily and quickly access relevant information. Moreover, the user device 105 may display the information cards in order of confidence scores and/or grouped for each detected face.

Moreover, the user device 105 may, if missing any information cards of any matching face IDs (e.g., for an entity ID associated with a face ID), transmit an information cards request message. The information cards request message may include a request for information cards for a face ID or entity ID that the user device 105 does not have a cached information card. In response to receiving the information cards request message, the card server 115 may obtain missing information cards and transmit the missing information cards to the user device 105.

In another aspect of the disclosure, a user may select the displayed detected face indicators to filter displayed information cards. For instance, the detected face indicators may be selectable by a user input to select/deselect detected face indicators to toggle displaying corresponding information cards for the detected faces. The user device 105 may, after receiving a user input selecting/deselecting a detected face indicator, filter corresponding information cards from the display of the GUI.

In another aspect of the disclosure, the user device 105 may, before sending the request message, display the search image with detected face indicators. The user device 105 may execute a face detection algorithm to generate detected face(s) information in order to display the search image with detected face indicators. Then, the detected face indicator may be selectable by a user input to select/deselect detected face indicators to toggle which faces are to be sent in a request message. For instance, the user device 105 may, after receiving a user input selecting/deselecting a detected face indicator, crop the search image to form cropped images; and generate request messages for each cropped image face, in a similar manner as discussed above. Furthermore, before forming separate request messages for each selected face/ cropped image, the user device 105 may determine whether the cropped images have a sufficient image quality (e.g., too blurry, out of focus, face in image is too small relative to overall image, etc.), acceptable aspect ratio, and/or an acceptable data size.

In another aspect of the disclosure, the user device 105 may receive feedback from a user regarding specific information cards in relation to detected faces. The user device 105 may receive a user input on a confirmation element of the GUI that the information card accurately corresponds to a detected face or does not correspond to a detected face. The user device 105 may then (for each such confirmation), transmit a message to the card server 115. The message may indicate that the face ID corresponding to the entity ID of the corresponding information card is a confirmed match, or that the face ID corresponding to the entity ID of the corresponding information card is a confirmed non-match. The card server 115 may then initiate a feedback process to update the training model with the facial recognition server 120 and/or transmit an updated face ID message to relevant user devices that the face ID corresponds to a particular entity ID. Moreover, the user device 105 may store the new association between face ID and entity ID, so that future returns of the face ID from the facial recognition server 120 return the entity ID faster (without having to match face IDs).

The feedback process may include: if the match was correct (e.g., the message indicates a confirmed match), then the card server 115 may update weights of a corresponding model so that the model is more confident to match the face ID when the model processes an image of the person's face in the future. If the match was not correct (e.g., the message indicates a confirmed non-match), then the card server 115 may update the weights the model to be less confident to match the face ID when the model processes an image of the person's face in the future. For instance, the card server 115 update the weights by initiating a training session and use the confirmed match/non-match as inputs to, e.g., a loss function to update the weights. Additionally or alternatively, the card server 115 may store the image of the confirmed match in association with the face ID/entity ID, process the image through the corresponding model, and transmit the updated face ID message, so that the set of faces to be matched against is increased. In this manner, the system may have a larger sample size for matching future photos against faces associated with information cards.

In another aspect of the disclosure, the user device 105 may send a plurality of request messages with different crops of a same face; receive a plurality face ID data structures in response to the request messages with a plurality of face IDs; and find a matching face ID using the plurality of face IDs. For instance, the user device 105 may send the plurality of request messages in response to receiving a face ID data structure that only has confidence scores below a threshold (e.g., the threshold confidence score or a different threshold confidence score, which may be a higher threshold confidence score than the threshold confidence score) for a detected face. To obtain different crops of the same face, the user device 105 may use the detected face(s) information, after sending an initial request message and receiving the detected face(s) information or using the face detection algorithm; and crop the image with variations bounding the face (e.g., different predetermined aspect ratios, different shifts of cropping left, right, top, bottom, center, and combinations thereof, etc.). Then, the user device 105 may proceed as discussed above with each of the obtained different crops to obtain the plurality of face IDs. To find the matching face ID using the plurality of face IDs, the user device 105 may: obtain the plurality face ID data structures; filter out matched faces that have low confidence scores (e.g., below a low threshold confidence score, such as below 70% (for instance, as the crop may have removed the face); and then determine an weighted average of remaining face IDs (e.g., of non-filtered out matched faces) to determine the most likely face ID (or face IDs, if several meet general threshold discussed above).

In another aspect of the disclosure, the facial recognition user input may be a user input activating an augmented reality (AR) function. In this case, the user device 105 may launch the AR function, update the GUI with an AR view using the camera application (e.g., as a portion of the current application interface or a separate GUI), and continuously monitor images output from the camera application using a face detection algorithm to detect a face; in response to detecting a face, capture an image of the images output from the camera application, generate and transmit a request message using the captured image, as discussed above; in response to receiving a matching IDs message from the facial recognition server 120 and by the AR function: generating a computer-generated image of an information card, and displaying the computer-generated image of the information card within the AR view. In the case of more than one matching face, the information card may be a matching face with a highest confidence score in the matching IDs message, or more than one computer-generated image may be generated and displayed for each of the more than one matching faces. Note, the continuously monitoring images output from the camera application may continue to detect any new faces and proceed to display one or more different computer-generated images of different information cards as a view of the physical world changes over time.

In another aspect of the disclosure, instead of or in addition to the facial recognition server 120 hosting a model to generate the face ID data structure, the user device 105 may host a model to generate the face ID data structure on the user device 105. In this case, the user device 105 may avoid transmitting request messages to the facial recognition server 120 in order to obtain the face ID data structure. For instance, user devices 105 may be equipped with special processing units (e.g., Neural Engine, GPUs) that may efficiently process machine leaning models (e.g., neural networks), therefore hosting the machine learning model on a separate device may be omitted. In this manner, the user device 105 may reduce bandwidth and potentially increase response time (omitting transmitting/receiving from the user device 105, but incurring processing time on the user device 105). In this aspect of the disclosure, the user device 105 may transmit to the card server 115 (either in response to each match or in periodic bulk processing) any matches between face IDs and entity IDs determined on the user device 105; the card server 115 may then transmit updated face ID messages to other relevant user devices (e.g., of users in an organization).

Some illustrative use examples for the methods and systems of the present disclosure may include:

(1) Employer Branding—Example 1: A user associated with a user device 105 may work on an organization Branding team and the user may wish to post a picture of a team bonding event on, e.g., social media. In order to give credit to the individuals who attended the event, the user might want to mention employees' names in the caption of the photo. The user may quickly see who is in the picture by selecting the image and viewing the one or more information cards for the matching faces, and have access to other information (such as which department they work in, who their manager is, etc., whichever is included in a card template provided to the user for the information cards).

(2) Employer Branding—Example 2: A user might like to post a photo of an organization team from a few months ago. The user might want to make sure that the photo posted includes only current organization team members, so as to accurately represent the team today. The user might quickly use the photo by selecting the image and viewing the one or more information cards for the matching faces, and have access to other information (such as current employment status, etc., whichever is included in a card template provided to the user for the information cards).

(3) Security—Example: A user might see a suspicious individual walking around an organization buildings. After obtaining an image of the individual (e.g., by asking permission), the user may select the image and view the one or more information cards for the matching faces (or none, if the user is not a member of an employee database).

(4) Presentation—Example: A user might be at a presentation and want additional information on the speaker, e.g., to give the user more context into the speaker's presentation. After obtaining an image of the speaker, the user may select the image and view the one or more information cards for the matching faces to view contextual information about the speaker.

(5) TV/Wall Pictures—Example: A user may walk by a TV or a wall with a picture of a featured employee/person. The user may be interested in the person (e.g., the user may realize that this featured individual could help you in a project that you are working on). After obtaining an image of the featured individual, the user may select the image and view the one or more information cards for the matching faces to view contextual information about the featured individual (e.g., contact information).

(6) Messaging service (e.g., slack)—Example: A user might be added to a messaging group-chat by a coworker. The user might not know everyone in the chat, so the user may want to find out more about the other users. If the other users have images associated with their messaging profile, after obtaining an image of one of the other users, the user may select the image and view the one or more information cards for the matching faces to view contextual information about the featured individual (e.g., the other user's department, manager, etc.).

Therefore, the system 100 of the present disclosure may quickly and easily display relevant information to a user. For instance, a system of the present disclosure may display a GUI to receive a facial recognition user input (e.g., a selection of an image and/or an AR function); based on the facial recognition user input, receive matching faces for detected faces of an image of the facial recognition user input; retrieve information cards corresponding to the matching faces; and update the GUI to display the information cards to the user. Therefore, a user may quickly and accurately retrieve relevant information when a user only has an image of a face/access to a camera function to obtain an image of a face.

Figure 2:
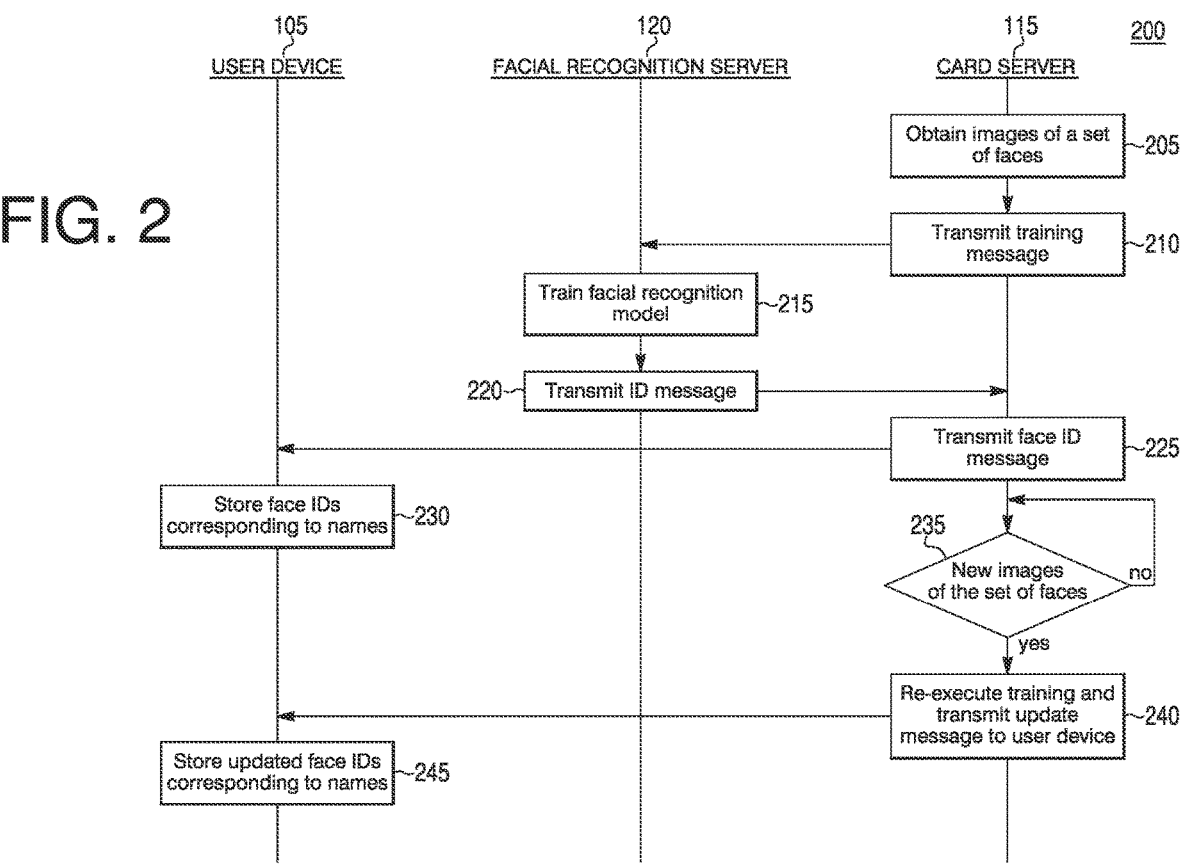
FIG. 2 depicts a flowchart for configuring a system for displaying relevant data based on facial recognition, according to one or more embodiments.

FIG. 2 depicts a flowchart 200 for configuring a system for displaying relevant data based on facial recognition, according to one or more embodiments. The flowchart 200 may be performed by, e.g., the user device 105 executing the application, the card server 115 executing the information card program, and the facial recognition server 120 executing the facial recognition program, as discussed above. As also disclosed above, one or both of the facial recognition server 120 and card server 115 may be located on the user device 105 or may be connected to the user device 105 via a wired or wireless connection (e.g., via network 110).

For instance, the card server 115 may start the process of the flowchart 200 by obtaining images of a set of faces (block 205). For instance, the card server 115 may obtain images from a plurality of information cards, as discussed above in FIG. 1.

The card server 115 may then transmit a training message to the facial recognition server 120 (block 210). For instance, the card server 115 may generate the training message, as discussed above in reference to FIG. 1.

In response to receiving the training message, the facial recognition server 120 may train a facial recognition model (block 215). For instance, the facial recognition server 120 may train and/or use a general purpose model, and generate an ID message with the face ID data structures for the images included in the training message, as discussed above in reference to FIG. 1. The facial recognition server 120 may then transmit the ID message to the card server 115 (block 220).

In response to receiving the ID message, the card server 115 may transmit a face ID message to one or more user devices, such as the user device 105 (block 225). In response to receiving the face ID message, the user device 105 may store face IDs corresponding to names (block 230). For instance, the user device 105 may store face IDs in association with the entity IDs, as discussed above in reference to FIG. 1.

After the facial recognition mode has been trained, the card server 115 may determine whether new images are included in the set of faces (or changes, such as removal and/or updates to already included images) (block 235). In response to no new images (block 235: No), the card server 115 may continue to return and determine whether new images of the set of faces are included (block 235). For instance, the card server 115 may wait for changes to the images of the set of faces to trigger an update to the facial recognition model, as discussed above in reference to FIG. 1.

In response to new images (block 235: Yes), the card server 115 may re-execute training (e.g., by performing block 210 and initiating blocks 215-220 of the facial recognition server 120) and transmit an updated face ID message to user devices, such as the user device 105 (block 240). For instance, the card server 115 may generate the updated face ID message to include new entity IDs associated with new face IDs; existing entity IDs with new face IDs; and/or instructions to delete existing entity IDs and associated face IDs, as discussed above in reference to FIG. 1.

The user device 105 may receive the updated face ID message and store updated face IDs corresponding to new names (block 245).

Figure 3:
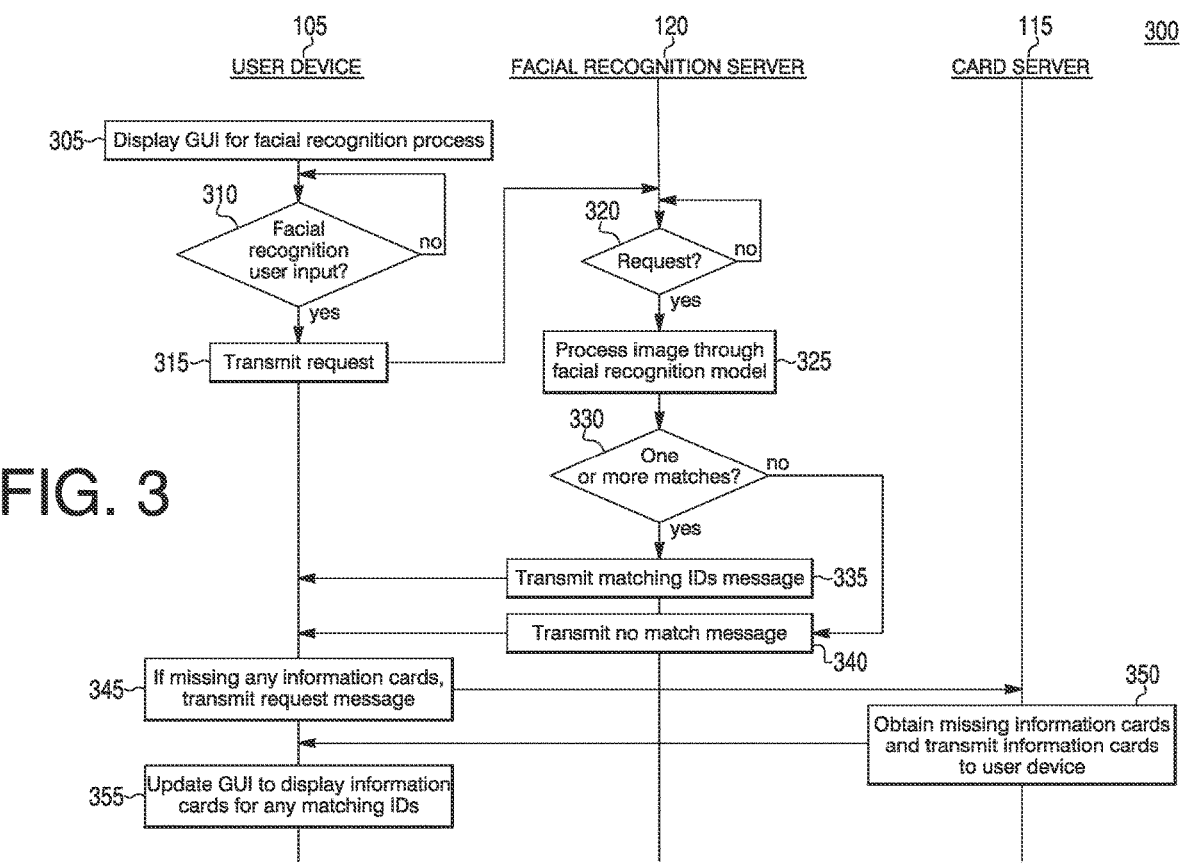
FIG. 3 depicts a flowchart for displaying relevant data based on facial recognition, according to one or more embodiments.

FIG. 3 depicts a flowchart 300 for displaying relevant data based on facial recognition, according to one or more embodiments. The flowchart 300 may be performed by, e.g., the user device 105 executing the application, the card server 115 executing the information card program, and/or the facial recognition server 120 executing the facial recognition program, as discussed above. For instance, the user device 105 may start the process of the flowchart 300 by displaying a GUI for the face recognition search process (block 305). For instance, the user device 105 may display an application interface, as discussed above in reference to FIG. 1.

Then, the user device 105 may determine whether a facial recognition user input has been received (block 310). For instance, the facial recognition user input may be a user input selecting an image for a search and/or a user input activing an AR function, as discussed above in FIG. 1. In response to not receiving the facial recognition user input (block 310: No), the facial recognition server 120 may return to wait for facial recognition user input (block 310) or to exit the GUI for the face recognition search process.

In response to receiving the facial recognition user input (block 310: Yes), the facial recognition server 120 may then transmit a request message to the facial recognition server 120 (block 315). Generally, the facial recognition server 120 may determine whether facial recognition server 120 has received a request message from a user device, such as the user device 105 (block 320). In response to not receiving the request message (block 320: No), the facial recognition server 120 may wait to receive the request message from a user device, such as the user device 105.

In response to receiving the request message (block 320: Yes), the facial recognition server 120 may process an image of the request message through a facial recognition model (block 325). For instance, the facial recognition server 120 may obtain a face ID data structure by processing the image through the facial recognition model, as discussed above in reference to FIG. 1.

The facial recognition server 120 may then determine whether there are one or more matches (block 330). In response to determining there are one or more matches (block 330: Yes), the facial recognition server 120 may transmit a matching IDs message to the user device 105 (block 335). In response to determining there are no matches (block 330: No), the facial recognition server 120 may transmit a no match message to the user device 105 (block 340).

In response to receiving the matching IDs message, the user device 105 may, if missing any information cards of any matching IDs, transmit information cards request message (block 345). In response to receiving the information cards request message, the card server 115 may obtain missing information cards and transmit the missing information cards to the user device 105 (block 350).

In the case of one or more matches, the user device 105 may (in response to receiving the matching IDs message and/or in response to receiving the missing information cards) update the GUI to display information cards for the one or more matching IDs (block 355).

Figure 4A:
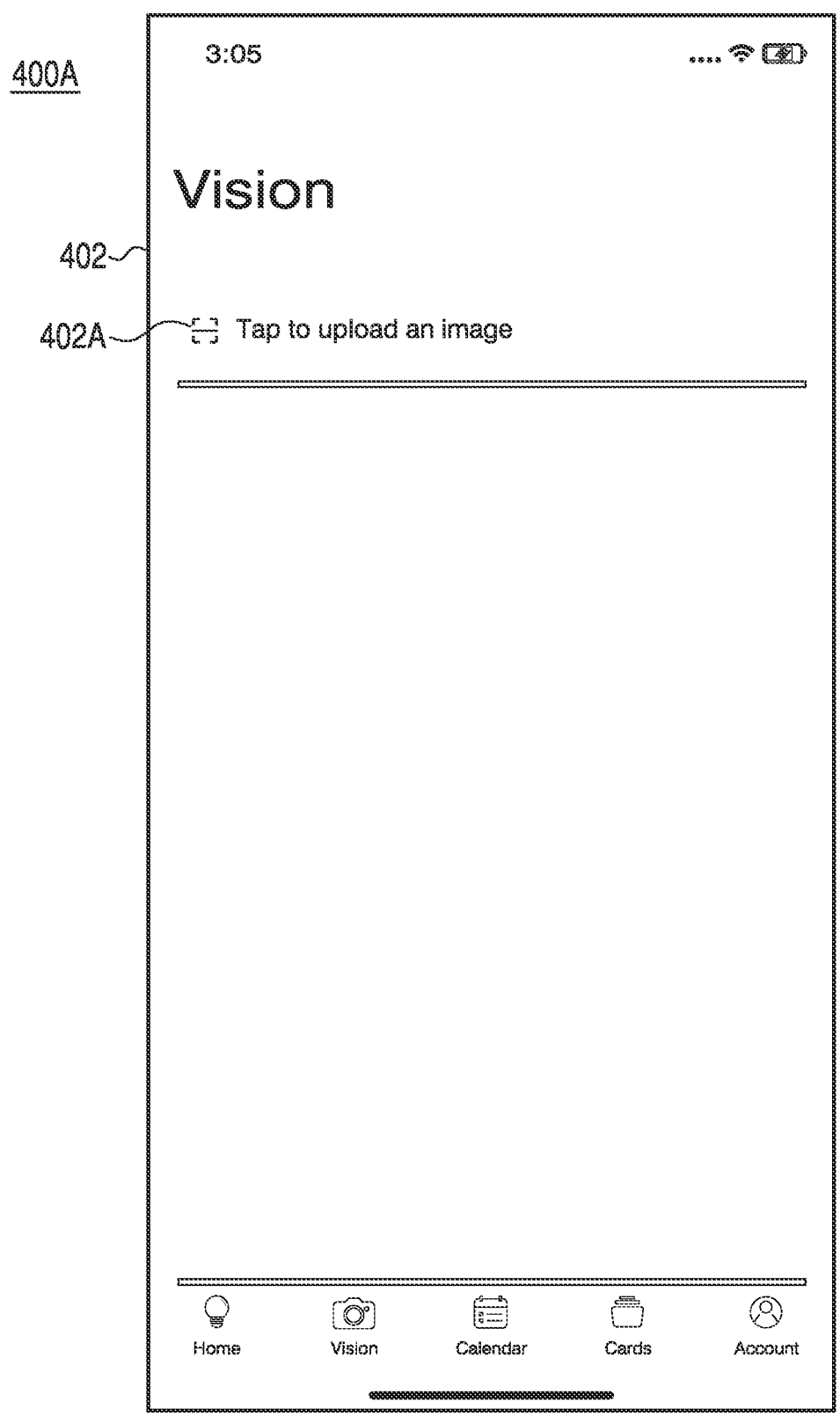
FIGS. 4A-4C depict GUIs of a user device display/UI for displaying relevant data based on facial recognition, according to one or more embodiments.
Figure 4B:
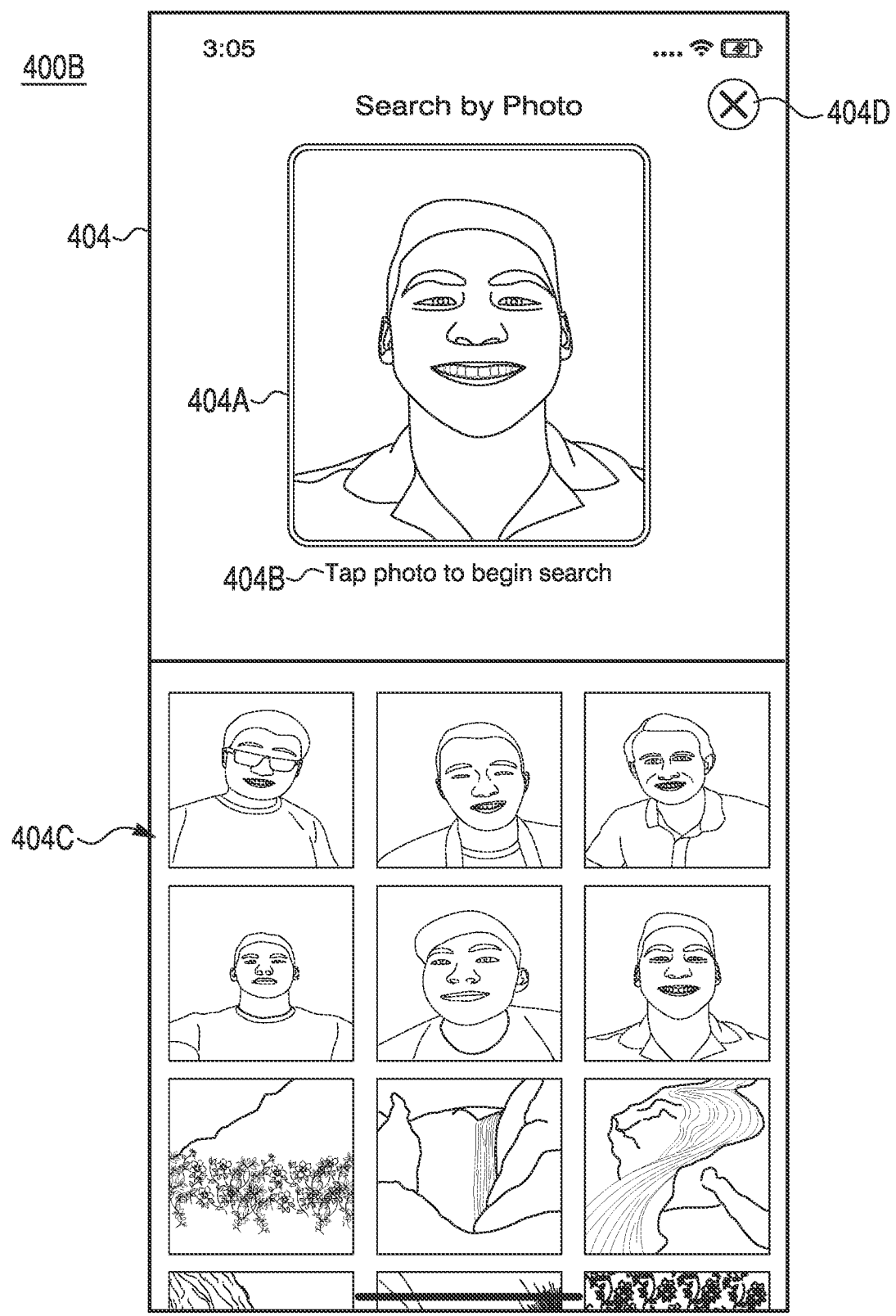
Figure 4C:
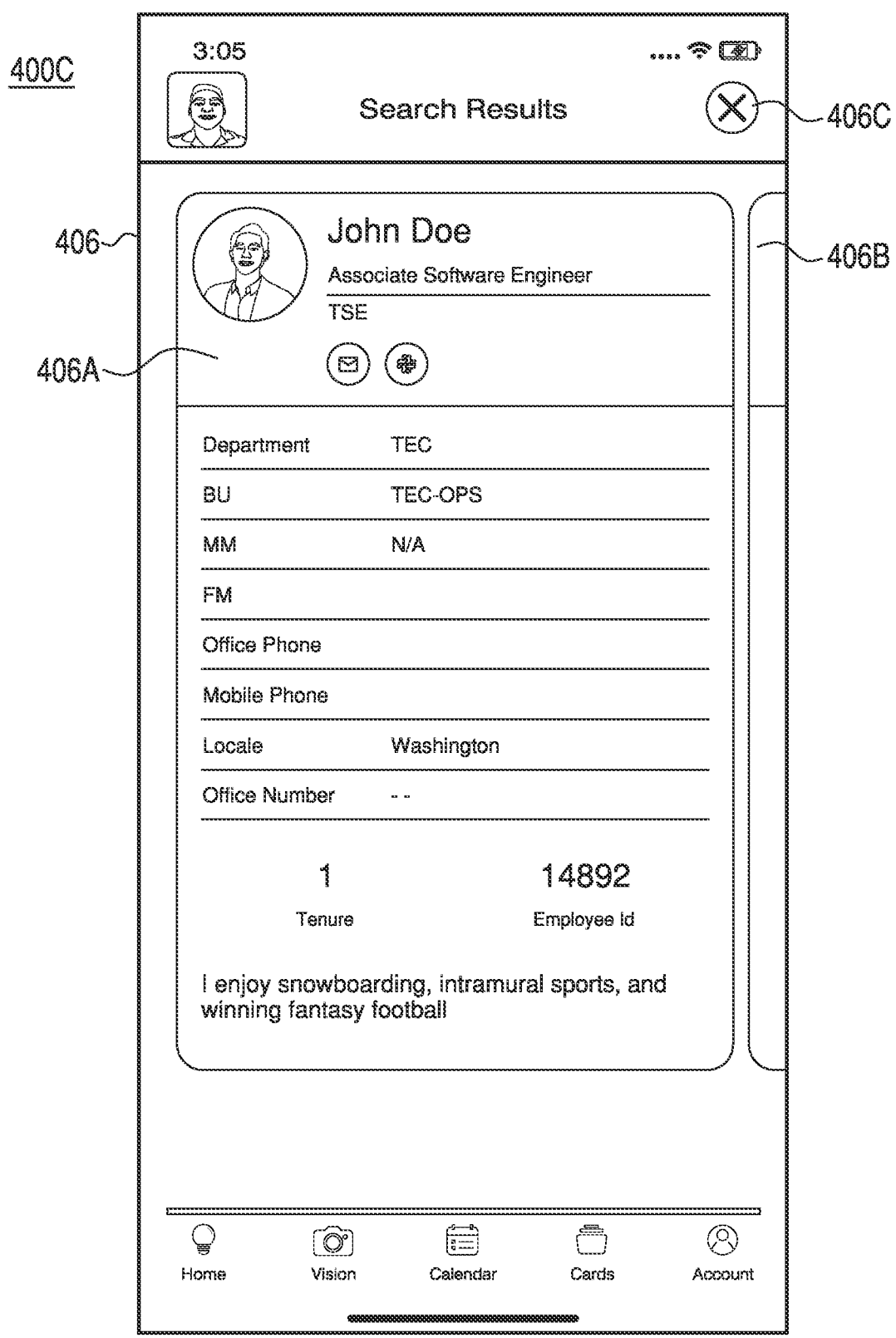

FIGS. 4A-4C depict GUIs of a user device display/UI for displaying relevant data based on facial recognition, according to one or more embodiments. In FIG. 4A, GUI 400A may depict an application interface 402 of the application of the user device 105, discussed above. Specifically, the application interface 402 may correspond to a search functionality of the application of the user device 105, which may be one of several functions the application provides a user of the user device 105. The application interface 402 may include a search element 402A. The search element 402A may be selectable by a user input (e.g., a touch input, voice selection, etc.) to image selection process. In response to the search element 402A being selected by a user input, the user device 105 open a camera application of the user device 105 (so the user may take a photo and use the photo as the search image) or access a picture library (e.g., camera roll) of the user device 105 (so the user may select a photo and use the photo as the search image).

In FIG. 4B, GUI 400B may depict an application interface 404 of the application of the user device 105, discussed above. Specifically, the application interface 404 may correspond to the search functionality of the application of the user device 105, after a user has selected an image to be the search image 404A. The application interface 404 may include the search image 404A selected by the user, a launch element 404B, a camera roll element 404C, and a close element 404D. The launch element 404B may indicate how a user may proceed (e.g., instructions for initiating the search process), and the launch element 404B (and/or the search image 404A) may be selectable by a user input (e.g., a touch input, voice selection, etc.) to initiate the face recognition search process using the search image 404A. The camera roll element 404C may display (e.g., in a grid or array) non-selected images from picture library of the user device 105. The individual non-selected images from the camera roll element 404C may be selectable by a user input (e.g., a touch input, voice selection, etc.) to become the search image 404A (thereby, replacing a current search image 404A with a selected image). The close element 404D may be selectable by a user input (e.g., a touch input, voice selection, etc.) to exit the face recognition search process, or to delete the search image 404A to allow the user the user to select a different image (e.g., from a camera application or picture library).

In FIG. 4C, GUI 400C may depict an application interface 406 of the application of the user device 105, discussed above. Specifically, the application interface 406 may correspond to the search functionality of the application of the user device 105, after a search image has been selected and the face recognition search process has been initiated by a user input. The user device 105 may then transmit the request message to the facial recognition server 120. The facial recognition server 120 may process the image through a facial recognition model, and transmit a result message (e.g., the no match message or the matching IDs message). The application interface 406 may correspond to a search result page. The application interface 406 may include none, one, or a plurality of information cards 406A and 406B corresponding to matchings IDs of the result message. The application interface 406 may also include an exit element 406C. The exit element 406C may be selectable by a user input (e.g., a touch input, voice selection, etc.) to exit the face recognition search process, or to exit the search result page to allow the user the user to select a different image (e.g., from a camera application or picture library) from the application interface 402 or 404.

Figure 5:
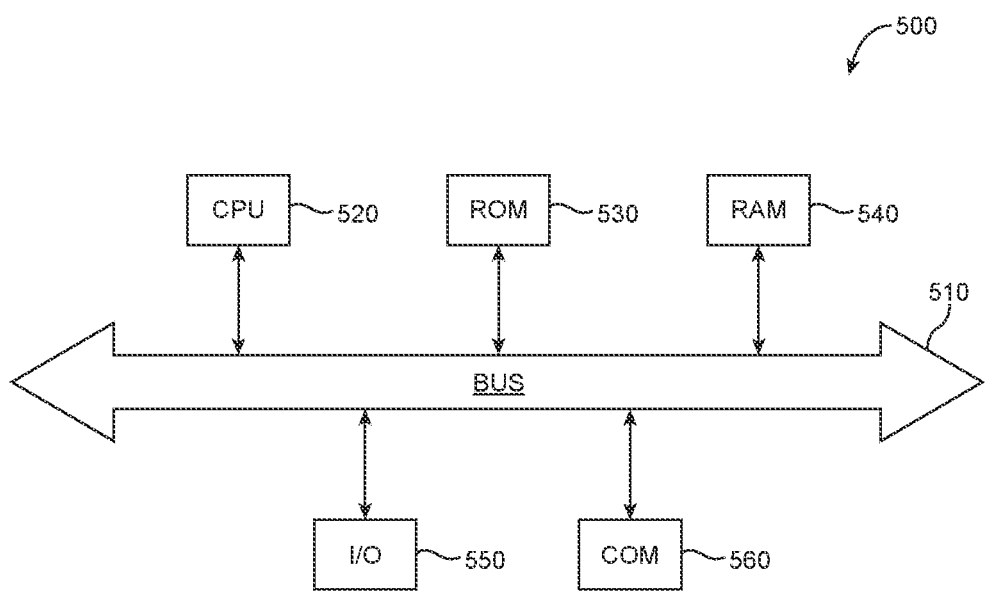
FIG. 5 depicts an example system that may execute techniques presented herein.

FIG. 5 depicts an example system that may execute techniques presented herein. FIG. 5 is a simplified functional block diagram of a computer that may be configured to execute techniques described herein, according to exemplary embodiments of the present disclosure. Specifically, the computer (or "platform" as it may not be a single physical computer infrastructure) may include a data communication interface 560 for packet data communication. The platform may also include a central processing unit ("CPU") 520, in the form of one or more processors, for executing program instructions. The platform may include an internal communication bus 510, and the platform may also include a program storage and/or a data storage for various data files to be processed and/or communicated by the platform such as ROM 530 and RAM 540, although the system 500 may receive programming and data via network communications. The system 500 also may include input and output ports 550 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A method for displaying relevant data based on analyzing electronic images for facial recognition, comprising:
    displaying a graphic user interface (GUI) on a display of a user device for a face recognition search process;
    determining whether a facial recognition user input has been received;
    in response to determining the facial recognition user input has been received, generating a request message, the request message including an image;
    formatting the image with a set ID, the set ID corresponding to an organization;
    transmitting the request message to a facial recognition service;
    receiving a response from the facial recognition service, the response being generated by the facial recognition service using a model selected based on the set ID extracted from the formatted image; and
    updating the GUI to display one or more information cards based on the received response, the one or more information cards being associated with the image, the one or more information cards being dynamically adjusted based on user device actions associated with the user device.

2. The method of claim 1, wherein the facial recognition user input is a user input on a launch element of the GUI launching a search process for the image, the image having been obtained from a camera application or a picture library of the user device as a search image associated with the launch element.

3. The method of claim 1, wherein the facial recognition user input is a user input on a launch element of the GUI launching a search process for the image, the image having been obtained from a camera application or a picture library of the user device as a search image associated with the launch element,
    wherein the generating the request message includes: processing the search image.

4. The method of claim 1, wherein the facial recognition user input is a user input on a launch element of the GUI launching a search process for the image, the image having been obtained from a camera application or a picture library of the user device as a search image associated with the launch element,
    wherein the generating the request message includes: processing the search image,
    wherein the processing the search image includes determining whether the search image has a sufficient image quality, acceptable aspect ratio, and/or an acceptable data size.

5. The method of claim 1, wherein the facial recognition user input is a user input on a launch element of the GUI launching a search process for the image, the image having been obtained from a camera application or a picture library of the user device as a search image associated with the launch element,
    wherein the generating the request message includes: processing the search image,
    wherein the processing the search image includes determining whether the search image has a sufficient image quality, acceptable aspect ratio, and/or an acceptable data size,
    wherein the processing the search image further comprises:
        in response to determining that the search image does not having the sufficient image quality, rejecting the search image from the process and displaying an error on the GUI;
        in response to determining that the search image does not having the acceptable aspect ratio, processing the search image into the acceptable aspect ratio by cropping the search image to the acceptable aspect ratio; and
        in response to determining that the search image does not having the acceptable data size, processing the search image through a lossless or lossy compression algorithm to reduce a data size of the search image.

6. The method of claim 1, wherein the facial recognition user input is a user input on a launch element of the GUI launching a search process for the image, the image having been obtained from a camera application or a picture library of the user device as a search image associated with the launch element,
    wherein the generating the request message includes: processing the search image,
    wherein the processing the search image includes determining whether the search image has a sufficient image quality, acceptable aspect ratio, and/or an acceptable data size,
    wherein the processing the search image further comprises:
        in response to determining that the search image does not having the sufficient image quality, rejecting the search image from the process and displaying an error on the GUI;
        in response to determining that the search image does not having the acceptable aspect ratio, processing the search image into the acceptable aspect ratio by cropping the search image to the acceptable aspect ratio; and
        in response to determining that the search image does not having the acceptable data size, processing the search image through a lossless or lossy compression algorithm to reduce a data size of the search image,
    wherein the response includes a face identification (ID) data structure,
    the face ID data structure includes detected face(s) information and/or matching face(s) information,
    the detected face(s) information indicates zero, one, or more detected face(s) in the search image and/or includes location and size information for each of the detected faces in the search image, and
    the matching face(s) information includes, for each detected face of the one or more detected face(s), zero, one, or more matching faces and, for each of the one or more matching faces, a face ID and/or a confidence score.

7. The method of claim 1, wherein the facial recognition user input is a user input on a launch element of the GUI launching a search process for the image, the image having been obtained from a camera application or a picture library of the user device as a search image associated with the launch element,
    wherein the generating the request message includes: processing the search image,
    wherein the processing the search image includes determining whether the search image has a sufficient image quality, acceptable aspect ratio, and/or an acceptable data size, wherein the processing the search image further comprises:
  in response to determining that the search image does not having the sufficient image quality, rejecting the search image from the process and displaying an error on the GUI;
  in response to determining that the search image does not having the acceptable aspect ratio, processing the search image into the acceptable aspect ratio by cropping the search image to the acceptable aspect ratio; and
  in response to determining that the search image does not having the acceptable data size, processing the search image through a lossless or lossy compression algorithm to reduce a data size of the search image,
wherein the response includes a face identification (ID) data structure, the face ID data structure includes detected face(s) information and/or matching face(s) information,
the detected face(s) information indicates zero, one, or more detected face(s) in the search image and/or includes location and size information for each of the detected faces in the search image, and
the matching face(s) information includes, for each detected face of the one or more detected face(s), zero, one, or more matching faces and, for each of the one or more matching faces, a face ID and/or a confidence score,
wherein the updating the GUI to display one or more information cards based on the received response includes:
  extracting the matching face(s) information from the face ID data structure;
  for each detected face, extracting a face ID and/or confidence score for zero, one, or more matching faces from the matching face(s) information;
  for each matching face, searching a locally-stored cache of face IDs for a cached match to the face ID;
  in response to determining a cached matching face ID, retrieving an associated locally-stored entity ID to the cached matching face ID;
  retrieving associated information card(s) based on the retrieved entity ID; and
  displaying the retrieved information card(s) as the one or more information cards when the search image includes a matching face.

8. A system for displaying relevant data based on analyzing electronic images for facial recognition, the system comprising:
  at least one memory storing instructions; and
  at least one processor executing the instructions to perform operations, the operations including:
    displaying a graphic user interface (GUI) on a display of a user device for a face recognition search process;
    determining whether a facial recognition user input has been received;
    in response to determining the facial recognition user input has been received, generating a request message, the request message including an image;
    formatting the image with a set ID, the set ID corresponding to an organization;
    transmitting the request message to a facial recognition service;
    receiving a response from the facial recognition service, the response being generated by the facial recognition service using a model selected based on the set ID extracted from the formatted image; and
    updating the GUI to display one or more information cards based on the received response, the one or more information cards being associated with the image, the one or more information cards being dynamically adjusted based on user device actions associated with the user device.

9. The system of claim 8, wherein the facial recognition user input is a user input on a launch element of the GUI launching a search process for the image, the image having been obtained from a camera application or a picture library of the user device as a search image associated with the launch element.

10. The system of claim 8, wherein the facial recognition user input is a user input on a launch element of the GUI launching a search process for the image, the image having been obtained from a camera application or a picture library of the user device as a search image associated with the launch element,
  wherein the generating the request message includes:
    processing the search image.

11. The system of claim 8, wherein the facial recognition user input is a user input on a launch element of the GUI launching a search process for the image, the image having been obtained from a camera application or a picture library of the user device as a search image associated with the launch element,
  wherein the generating the request message includes:
    processing the search image,
  wherein the processing the search image includes determining whether the search image has a sufficient image quality, acceptable aspect ratio, and/or an acceptable data size.

12. The system of claim 8, wherein the facial recognition user input is a user input on a launch element of the GUI launching a search process for the image, the image having been obtained from a camera application or a picture library of the user device as a search image associated with the launch element,
  wherein the generating the request message includes:
    processing the search image, and
  wherein the processing the search image includes determining whether the search image has a sufficient image quality, acceptable aspect ratio, and/or an acceptable data size,
  wherein the processing the search image further comprises:
    in response to determining that the search image does not having the sufficient image quality, rejecting the search image from the process and displaying an error on the GUI;
    in response to determining that the search image does not having the acceptable aspect ratio, processing the search image into the acceptable aspect ratio by cropping the search image to the acceptable aspect ratio; and
    in response to determining that the search image does not having the acceptable data size, processing the search image through a lossless or lossy compression algorithm to reduce a data size of the search image.

13. The system of claim 8, wherein the facial recognition user input is a user input on a launch element of the GUI launching a search process for the image, the image having been obtained from a camera application or a picture library of the user device as a search image associated with the launch element, wherein the generating the request message includes:
processing the search image,
wherein the processing the search image includes determining whether the search image has a sufficient image quality, acceptable aspect ratio, and/or an acceptable data size,
wherein the processing the search image further comprises:
in response to determining that the search image does not having the sufficient image quality, rejecting the search image from the process and displaying an error on the GUI;
in response to determining that the search image does not having the acceptable aspect ratio, processing the search image into the acceptable aspect ratio by cropping the search image to the acceptable aspect ratio; and
in response to determining that the search image does not having the acceptable data size, processing the search image through a lossless or lossy compression algorithm to reduce a data size of the search image, and
wherein the response includes a face identification (ID) data structure,
the face ID data structure includes detected face(s) information and/or matching face(s) information,
the detected face(s) information indicates zero, one, or more detected face(s) in the search image and/or includes location and size information for each of the detected faces in the search image, and
the matching face(s) information includes, for each detected face of the one or more detected face(s), zero, one, or more matching faces and, for each of the one or more matching faces, a face ID and/or a confidence score.

14. The system of claim 8, wherein the facial recognition user input is a user input on a launch element of the GUI launching a search process for the image, the image having been obtained from a camera application or a picture library of the user device as a search image associated with the launch element,
wherein the generating the request message includes:
processing the search image,
wherein the processing the search image includes determining whether the search image has a sufficient image quality, acceptable aspect ratio, and/or an acceptable data size,
wherein the processing the search image further comprises:
in response to determining that the search image does not having the sufficient image quality, rejecting the search image from the process and displaying an error on the GUI;
in response to determining that the search image does not having the acceptable aspect ratio, processing the search image into the acceptable aspect ratio by cropping the search image to the acceptable aspect ratio; and
in response to determining that the search image does not having the acceptable data size, processing the search image through a lossless or lossy compression algorithm to reduce a data size of the search image,
wherein the response includes a face identification (ID) data structure,
the face ID data structure includes detected face(s) information and/or matching face(s) information,
the detected face(s) information indicates zero, one, or more detected face(s) in the search image and/or includes location and size information for each of the detected faces in the search image, and
the matching face(s) information includes, for each detected face of the one or more detected face(s), zero, one, or more matching faces and, for each of the one or more matching faces, a face ID and/or a confidence score,
wherein the updating the GUI to display one or more information cards based on the received response includes:
extracting the matching face(s) information from the face ID data structure;
for each detected face, extracting a face ID and/or confidence score for zero, one, or more matching faces from the matching face(s) information;
for each matching face, searching a locally-stored cache of face IDs for a cached match to the face ID;
in response to determining a cached matching face ID, retrieving an associated locally-stored entity ID to the cached matching face ID;
retrieving associated information card(s) based on the retrieved entity ID; and
displaying the retrieved information card(s) as the one or more information cards when the search image includes a matching face.

15. A non-transitory computer-readable medium storing instructions that, when executed by a processor, cause the processor to perform operations for displaying relevant data based on analyzing electronic images for facial recognition, the operations comprising:
displaying a graphic user interface (GUI) on a display of a user device for a face recognition search process;
determining whether a facial recognition user input has been received;
in response to determining the facial recognition user input has been received, generating a request message, the request message including an image;
formatting the image with a set ID, the set ID corresponding to an organization;
transmitting the request message to a facial recognition service;
receiving a response from the facial recognition service, the response being generated by the facial recognition service using a model selected based on the set ID extracted from the formatted image; and
updating the GUI to display one or more information cards based on the received response, the one or more information cards being associated with the image, the one or more information cards being dynamically adjusted based on user device actions associated with the user device.

16. The non-transitory computer-readable medium of claim 15, wherein the facial recognition user input is a user input on a launch element of the GUI launching a search process for the image, the image having been obtained from a camera application or a picture library of the user device as a search image associated with the launch element.

17. The non-transitory computer-readable medium of claim 15, wherein the facial recognition user input is a user input on a launch element of the GUI launching a search process for the image, the image having been obtained from a camera application or a picture library of the user device as a search image associated with the launch element,
wherein the generating the request message includes:
processing the search image.

18. The non-transitory computer-readable medium of claim 15, wherein the facial recognition user input is a user input on a launch element of the GUI launching a search process for the image, the image having been obtained from a camera application or a picture library of the user device as a search image associated with the launch element,
    wherein the generating the request message includes:
        processing the search image, and
    wherein the processing the search image includes:
        determining whether the search image has a sufficient image quality, acceptable aspect ratio, and/or an acceptable data size;
        in response to determining that the search image does not having the sufficient image quality, rejecting the search image from the process and displaying an error on the GUI;
        in response to determining that the search image does not having the acceptable aspect ratio, processing the search image into the acceptable aspect ratio by cropping the search image to the acceptable aspect ratio; and
        in response to determining that the search image does not having the acceptable data size, processing the search image through a lossless or lossy compression algorithm to reduce a data size of the search image.

19. The non-transitory computer-readable medium of claim 15, wherein the facial recognition user input is a user input on a launch element of the GUI launching a search process for the image, the image having been obtained from a camera application or a picture library of the user device as a search image associated with the launch element,
    wherein the generating the request message includes:
        processing the search image,
    wherein the processing the search image includes:
        determining whether the search image has a sufficient image quality, acceptable aspect ratio, and/or an acceptable data size;
        in response to determining that the search image does not having the sufficient image quality, rejecting the search image from the process and displaying an error on the GUI;
        in response to determining that the search image does not having the acceptable aspect ratio, processing the search image into the acceptable aspect ratio by cropping the search image to the acceptable aspect ratio; and
        in response to determining that the search image does not having the acceptable data size, processing the search image through a lossless or lossy compression algorithm to reduce a data size of the search image,
    wherein the response includes a face identification (ID) data structure,
    the face ID data structure includes detected face(s) information and/or matching face(s) information,
    the detected face(s) information indicates zero, one, or more detected face(s) in the search image and/or includes location and size information for each of the detected faces in the search image, and
    the matching face(s) information includes, for each detected face of the one or more detected face(s), zero, one, or more matching faces and, for each of the one or more matching faces, a face ID and/or a confidence score.

20. The non-transitory computer-readable medium of claim 15, wherein the facial recognition user input is a user input on a launch element of the GUI launching a search process for the image, the image having been obtained from a camera application or a picture library of the user device as a search image associated with the launch element,
    wherein the generating the request message includes:
        processing the search image,
    wherein the processing the search image includes:
        determining whether the search image has a sufficient image quality, acceptable aspect ratio, and/or an acceptable data size;
        in response to determining that the search image does not having the sufficient image quality, rejecting the search image from the process and displaying an error on the GUI;
        in response to determining that the search image does not having the acceptable aspect ratio, processing the search image into the acceptable aspect ratio by cropping the search image to the acceptable aspect ratio; and
        in response to determining that the search image does not having the acceptable data size, processing the search image through a lossless or lossy compression algorithm to reduce a data size of the search image,
    wherein the response includes a face identification (ID) data structure,
    the face ID data structure includes detected face(s) information and/or matching face(s) information,
    the detected face(s) information indicates zero, one, or more detected face(s) in the search image and/or includes location and size information for each of the detected faces in the search image, and
    the matching face(s) information includes, for each detected face of the one or more detected face(s), zero, one, or more matching faces and, for each of the one or more matching faces, a face ID and/or a confidence score,
    wherein the updating the GUI to display one or more information cards based on the received response includes:
        extracting the matching face(s) information from the face ID data structure;
        for each detected face, extracting a face ID and/or confidence score for zero, one, or more matching faces from the matching face(s) information;
        for each matching face, searching a locally-stored cache of face IDs for a cached match to the face ID;
        in response to determining a cached matching face ID, retrieving an associated locally-stored entity ID to the cached matching face ID;
        retrieving associated information card(s) based on the retrieved entity ID; and
        displaying the retrieved information card(s) as the one or more information cards when the search image includes a matching face.

\* \* \* \* \*